Oct. 22, 1929.　　　S. C. CARNEY　　　1,732,460
REFRIGERATING PROCESS
Filed Jan. 2, 1926
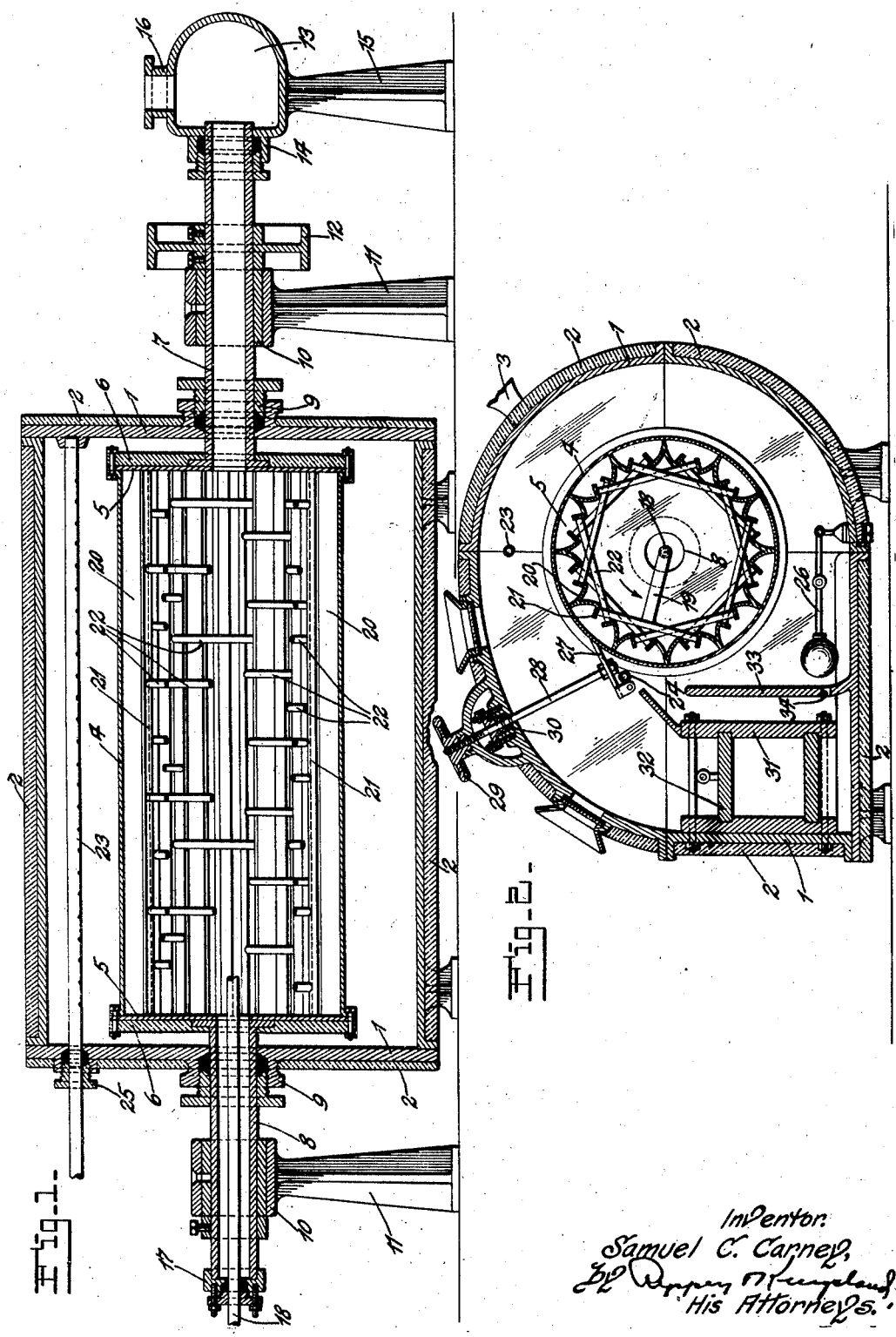

Patented Oct. 22, 1929

1,732,460

UNITED STATES PATENT OFFICE

SAMUEL C. CARNEY, OF TULSA, OKLAHOMA, ASSIGNOR TO SHELL PETROLEUM CORPORATION, A CORPORATION OF VIRGINIA

REFRIGERATING PROCESS

Application filed January 2, 1926. Serial No. 78,901.

This invention relates to improvements in refrigerating processes.

An object of the invention is to provide a process for cooling liquids which includes bringing the liquid into contact with a revoluble member that is supplied interiorly with the refrigerant, then removing the congealed liquid from the revolving member, and compacting into cakes the particles thus removed.

Additional objects of the invention will be apparent from the following detailed description taken in connection with the accompanying drawing in which is shown a suitable form of apparatus for practicing the process, and in which Fig. 1 is a vertical section through the apparatus; and Fig. 2 is a cross section thereof.

An example of the process will be readily understood by reference to a disclosure of the apparatus in the accompanying drawing in which there is provided a housing 1 preferably of a shape shown in cross section in Fig. 2 and which is thoroughly insulated exteriorly by a covering 2 of insulating material.

The joints of the housing 1 are all sealed so as to form an airtight compartment that may be installed to maintain a partial vacuum within the housing during the refrigerating operation. For this purpose a pipe 3 is provided in the housing for connection with a vacuum pump. While the maintenance of a vacuum in the housing is not essential in all cases, it is generally preferable as it results in removing air or other dissolved gases from the liquids being frozen. Furthermore, the vacuum acts as an insulating jacket, preventing undue heat transfer from the exterior of the housing and thereby assisting to maintain a lowered temperature within the housing during the freezing operation.

A revolving drum is mounted within the housing, said drum comprising a cylindrical wall 4 preferably made of a relatively thin metal having a high heat conductivity. The ends of the drum are closed by end plates 5 arranged with their marginal edges to extend beyond the periphery of the drum 4. The end plates are insulated by layers 6 of insulating material. The drum is supported for rotation in the housing by hollow shafts 7 and 8, said shafts being directly connected through respective ones of the end plates 5 and thereby communicate with the interior of the drum. Where the shafts 7 and 8 extend through the housing the joints between the shafts and housing are sealed by a stuffing box 9. Each of the shafts 7 and 8 is journaled in a bearing 10 supported by brackets 11, and the shaft 7 is equipped with a pulley 12 from which it may be driven by any suitable source of power to rotate the drum. The outer end of the shaft 7 is connected into a casting 13 that forms a chamber. A stuffing box 14 seals the connection between the end of the shaft 7 and the chamber 13, and the chamber 13 is supported in alinement with the end of the shaft by a bracket 15. The chamber 13 has a pipe connection 16 through its upper wall into which a pipe leading to the refrigerant recovery system may be connected.

The outer end of the shaft 8 carries a stuffing box 17 through which a refrigerant supply pipe 18 extends. The refrigerant supply pipe projects into the drum for a distance approximately midway of its length and then turns at an angle of approximately ninety degrees to form a nozzle 19, the outlet of which is slightly below the scraping knife presently to be described.

A series of troughs are arranged around the interior wall of the drum, said troughs being composed of inwardly curved walls 20 connected at their outer ends directly with a wall 14 and running longitudinally thereof. The walls 20 have up-turned flanges 21 at their inner ends, said flanges being slightly spaced apart, thus forming a plurality of troughs with longitudinal openings in the center thereof running parallel with the axis of the drum. A series of pipes 22 extend from one trough to another, the connected troughs being approximately sixty degrees apart. The pipes connect alternate ones of the troughs, which is a suitable arrangement for the number and arrangement of troughs shown in the drawing.

It will be understood from the description of the arrangement of the refrigerant supply pipe and the arrangement of the troughs with their connecting cross conduits, that the original refrigerant supply discharged from the nozzle 19 enters the troughs successively as they pass a point in their rotation slightly below the position of the scraping knife, later to be referred to. Intercommunication between the troughs is provided for by perforating the walls 20 along a line where they join the wall surface of the drum, and also by the pipes 22. The result of this arrangement is that the entire internal surface of the drum, except a segment of approximately ninety degrees of the circumference positioned at the top of the drum, during its rotation will be subjected to a continuous bath of the refrigerant liquid. The relatively large open space in the central portion of the drum provides a chamber into which the vapor of the refrigerating liquid escapes.

In practicing the process of the invention, the refrigerant, in liquid form, and which preferably comprises a liquefied hydrocarbon refrigerant, although other liquid may be employed, is first poured into the troughs on the descending side of the drum as it is revolved, and there is also introduced into the descending troughs through the cross connecting pipes 22, refrigerant which has not escaped through the perforations in the trough on the ascending side of the drum during its revolution. It is contemplated that the lower portion of the drum shall carry at all times a reasonably large supply of the refrigerating liquid which is continuously replenished through the pipe 18 and is picked up by the troughs as they successively pass the lowest point in their revolution, for distribution to the ascending part of the drum surface by leakage through the perforations in the walls of the trough and for transfer through the pipes 22 from the troughs completing an ascending part of the revolution to those beginning the descent.

Two supply pipes 23 and 24 extend longitudinally of the housing, the pipe 23 being arranged near the top of the housing and in a plane that passes approximately through the axis of the drum 4 in a vertical direction. The pipe 23 is sealed at one end by connecting it into a boss on one of the end walls of the housing and at the opposite end extends out through the other end of the housing, the joint between the pipe and the housing being sealed by a stuffing box 25. The pipe 23 connects with an external source of supply of the liquid to be frozen, the liquid being preferably precooled to a reasonable extent before introduction into the pipe 23. The pipe 23 is perforated throughout the length thereof that extends within the housing and should be preferably made adjustable in a rotary direction so that the incoming liquid may be sprayed against the surface of the drum 4 in both directions. The liquid flowing in the direction of rotation of the drum (Fig. 2) serves to move the scraping knife edge and the frozen mass that is scraped from the periphery of the drum by the knife.

A part of the liquid flowing in the reverse direction of rotation of the drum will be frozen on the drum periphery, but a sufficient amount should be supplied in order to provide an excess to bathe off the air bubbles from the portion that is frozen. Any excess liquid flowing in either direction accumulates in the bottom of the housing.

The pipe 24 extends longitudinally of the drum and is likewise sealed at one end against one of the ends of the drum and extends outwardly from the other end of the drum through a stuffing box (not shown). The pipe 24 is positioned below the scraping knife but approximate thereto. The liquid from the pipe 24 is discharged against the drum in the direction of its rotation, and the liquid should be supplied with sufficient force to cause a considerable velocity relative to the surface of the drum spraying a relatively thin layer of liquid against the periphery of the drum, which liquid rapidly freezes due to the fact that the wall of the drum has a very high heat conductivity, and the heat from the liquid is rapidly withdrawn by the action of the refrigerent within the drum. The excess liquid accumulates in the bottom of the housing and where a liquid such as raw water is used, it is desirable to continuously withdraw the water from the bottom of the housing to prevent the concentration of impurities. The excess liquid in the bottom of the housing is withdrawn through any suitable discharge outlet (not shown) which may be controlled by liquid level control of usual type and indicated in the drawing at 26. The accumulated excess of the liquid in the bottom of the housing will be maintained at a temperature closely approximating the freezing point of the liquid. The temperature may be regulated by controlling the amount of excess supplied through the supply pipes.

As the liquid is congealed on the drum, it is scraped off and removed therefrom by a scraping knife 27 which is set at a tangent to the periphery of the drum and extends outwardly therefrom in the direction of the rotation of the drum. The scraping knife extends the full length of the drum and is carried by a rod 28, the outer end of which projects through the housing and is equipped with a hand wheel 29 whereby the adjustments between the knife edge and the drum may be regulated. The opening in the housing through which the rod 28 extends is sealed by a stuffing box 30.

The frozen liquid after being scraped from the drum by the knife 27 is deflected into a mold 31 by which it is compressed into cakes. The mold 31 is provided with a slidable cover 32 which is opened and closed for the admission of the bodies of frozen liquid scraped from the drum.

The specific construction of the mold is not a part of the present invention, but is disclosed in complete detail in my copending application filed December 7, 1925, Serial No. 73,851.

It will be noted that the mold is separated from the housing by a baffle wall 33 in which there is a port 34, so that a portion of the mold will be submerged in the excess liquid contained in the bottom of the housing, which serves to maintain the walls of the mold at a temperature under which the separate or frozen bodies may be readily compacted, and sufficiently high to prevent adherence of the frozen cakes to the walls of the mold.

From the foregoing, it will be understood that the process is practiced by supplying the interior of the rotating member with a refrigerating agent which is preferably a liquid having a hydrocarbon content. This supply is continuous through the pipe 18 from which it flows through the nozzle 19. It is then distributed against the inner periphery of the drum by the system of troughs and cross pipe connections heretofore described. The continuous evaporation of the refrigerant serves to maintain a low internal temperature in the drum, the evaporated gas being withdrawn through the pipe 7 and thence through the chamber 13 and the pipe 16 to a recovery system.

The liquid to be frozen is supplied to the exterior of the drum through the liquid supply pipes 23 and 24, serving the purpose of maintaining a constant supply of liquid in contact with the cooled wall of the drum resulting in the continuous formation of a relatively thin layer of the frozen liquid which is bathed with an excess supply of the liquid to remove the air bubbles therefrom. The frozen layer is continuously removed from the drum by the action of the scraping knife, and the removed frozen liquid is then compacted to form cakes of commercial size. The entire process may be carried on with a partial vacuum within the housing, the result being that commercial cakes of the frozen liquid may be continuously formed with a relatively small amount of refrigerating liquid.

It is contemplated that the process may be applied not only to freezing the liquid to form ice cakes, but also for other purposes, for example, cooling viscous liquids such as lubricating oil, and the like.

What I claim and desire to secure by Letters Patent is:—

1. A process of freezing liquids which consists in spreading a refrigerant in a thin film and expandng the same in a chamber, supplying a liquid to be frozen to the external wall of the chamber in the presence of a partial vacuum, removing the liquid when frozen, compacting the frozen liquid removed into cakes and continuously maintaining the partial vacuum throughout the entire operation.

2. The process of congealing and compacting ice which consists in subjecting water to a refrigerating surface in the presence of a continuous reduced pressure, removing the frozen water from the refrigerated surface in small particles, and compacting the particles while in the reduced pressure area.

3. The process of freezing water which consists in supplying water in excess to a refrigerated surface in the presence of a continuous partial vacuum saturated with water vapor to form ice in thin layers, continuously removing the ice layers, and compacting the same while held in the partial vacuum area.

SAMUEL C. CARNEY.